(12) United States Patent
Hong et al.

(10) Patent No.: US 12,510,374 B2
(45) Date of Patent: Dec. 30, 2025

(54) ELECTRONIC DEVICE FOR SETTING AUTHORITY OF INDOOR MAP-BASED DEVICE AND OPERATING METHOD THEREOF

(71) Applicant: Samsung Electronics Co., Ltd., Suwon-si (KR)

(72) Inventors: Sunghyun Hong, Suwon-si (KR); Dowan Kim, Suwon-si (KR); Junsuk Kim, Suwon-si (KR); Eunmo Yang, Suwon-si (KR); Donghyun Lee, Suwon-si (KR); Hyuncheol Park, Suwon-si (KR); Hwajeong Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 18/065,229

(22) Filed: Dec. 13, 2022

(65) Prior Publication Data

US 2023/0160717 A1    May 25, 2023

Related U.S. Application Data

(63) Continuation of application No. PCT/KR2022/018562, filed on Nov. 23, 2022.

(30) Foreign Application Priority Data

Nov. 23, 2021  (KR) .................. 10-2021-0162589
Jan. 17, 2022  (KR) .................. 10-2022-0006503

(51) Int. Cl.
    *G01C 21/00*    (2006.01)
(52) U.S. Cl.
    CPC ....... *G01C 21/383* (2020.08); *G01C 21/3841* (2020.08)

(58) Field of Classification Search
    CPC . G01C 21/383; G01C 21/3841; H04W 12/08; H04W 12/63; H04W 12/64;
    (Continued)

(56) References Cited

U.S. PATENT DOCUMENTS 6,885,362 B2    4/2005   Suomela
7,227,529 B2    6/2007   Suomela
(Continued)

FOREIGN PATENT DOCUMENTS

AU    2019265433 A1    11/2020
JP       5994415 B2     9/2016
(Continued)

OTHER PUBLICATIONS

International Search Report dated Mar. 14, 2023, issued in International Patent Application No. PCT/KR2022/018562.
(Continued)

*Primary Examiner* — Hirdepal Singh
(74) *Attorney, Agent, or Firm* — Jefferson IP Law, LLP

(57) ABSTRACT

An electronic device is provided. The electronic device includes a communication module, a processor, and a memory storing instructions, the electronic device receives information indicating that a first external electronic device entered a designated space, from at least one anchor in the designated space, in response to receiving the information, establishes a communication connection with the first external electronic device using the communication module, after establishing the communication connection with the first external electronic device, receives a request of use authority of a first device among devices positioned in the designated space from the first external electronic device, identifies use authority set for the first external electronic device, based on information on the first device and information on the first external electronic device, and transmits information to the
(Continued)

first external electronic device and the first device so the set use authority is applied to the first external electronic device.

20 Claims, 11 Drawing Sheets

(58) Field of Classification Search
CPC ....... H04W 4/021; H04W 4/33; H04W 88/02; H04W 4/02; H04W 4/023
USPC ...................................................... 455/456.3
See application file for complete search history.

(56) References Cited

U.S. PATENT DOCUMENTS

| | | | |
|---|---|---|---|
| 9,462,108 | B2 | 10/2016 | Ko et al. |
| 9,978,260 | B2 | 5/2018 | Lee et al. |
| 10,114,453 | B2 | 10/2018 | Tanaka et al. |
| 10,140,769 | B2 | 11/2018 | Kim et al. |
| 10,191,537 | B2 | 1/2019 | Tanaka et al. |
| 10,895,971 | B2 | 1/2021 | Jones et al. |
| 10,943,470 | B2 | 3/2021 | Lee et al. |
| 11,212,132 | B2 | 12/2021 | Jeong |
| 11,585,917 | B1 | 2/2023 | Wu et al. |
| 11,704,011 | B2 | 7/2023 | Jones et al. |
| 2014/0266669 | A1* | 9/2014 | Fadell .................... G08B 19/00 340/501 |
| 2015/0080014 | A1* | 3/2015 | Ben-Yosef ............ H04W 4/023 455/456.1 |
| 2015/0264564 | A1* | 9/2015 | Vanderhulst .......... H04W 4/023 726/3 |
| 2016/0148417 | A1* | 5/2016 | Kim .......................... G06F 3/14 345/419 |
| 2016/0259932 | A1 | 9/2016 | Lakshmanan et al. |
| 2017/0273165 | A1 | 9/2017 | Sung et al. |
| 2019/0045329 | A1 | 2/2019 | Natsume et al. |
| 2019/0347180 | A1 | 11/2019 | Cranfill et al. |
| 2019/0347181 | A1 | 11/2019 | Cranfill et al. |
| 2022/0057922 | A1 | 2/2022 | Wang et al. |
| 2023/0075389 | A1 | 3/2023 | Wu et al. |
| 2023/0137878 | A1* | 5/2023 | Kurata ................... G06F 21/32 |

FOREIGN PATENT DOCUMENTS

| | | |
|---|---|---|
| JP | 2016-181896 A | 10/2016 |
| JP | 2020/522156 A | 7/2020 |
| KR | 10-2004-0015802 A | 2/2004 |
| KR | 10-2014-0055799 A | 5/2014 |
| KR | 10-2014-0067576 A | 6/2014 |
| KR | 10-1488096 B1 | 1/2015 |
| KR | 10-1549027 B1 | 9/2015 |
| KR | 10-2016-0062294 A | 6/2016 |
| KR | 10-1770156 B1 | 8/2017 |
| KR | 10-1797231 B1 | 11/2017 |
| KR | 10-1920131 B1 | 11/2018 |
| KR | 10-2019-0094128 A | 8/2019 |
| KR | 10-2102246 B1 | 4/2020 |

OTHER PUBLICATIONS

European Search report dated Nov. 26, 2024, issued in European Application No. 22899007.3.

* cited by examiner

400

ELECTRONIC DEVICE FOR SETTING AUTHORITY OF INDOOR MAP-BASED DEVICE AND OPERATING METHOD THEREOF

CROSS-REFERENCE TO RELATED APPLICATION(S)

This application is a continuation application, claiming priority under § 365(c), of an International application No. PCT/KR2022/018562, filed on Nov. 23, 2022, which is based on and claims the benefit of a Korean patent application number 10-2021-0162589, filed on Nov. 23, 2021, in the Korean Intellectual Property Office, and of a Korean patent application number 10-2022-0006503, filed on Jan. 17, 2022, in the Korean Intellectual Property Office, the disclosure of each of which is incorporated by reference herein in its entirety.

TECHNICAL FIELD

The disclosure relates to an electronic device for setting authority of an indoor map-based device and an operation method thereof.

BACKGROUND ART

An electronic device may grant different use authorities to users based on purposes of the use thereof.

The granting of the use authority may be performed by a manager of a public electronic device setting the public electronic device. Alternatively, the granting of the use authority may be performed by a parent setting use authority of an electronic device of a child.

An example of a program that supports the granting of use authority includes a mobile device management (MDM) program, or a children care program.

The above information is presented as background information only to assist with an understanding of the disclosure. No determination has been made, and no assertion is made, as to whether any of the above might be applicable as prior art with regard to the disclosure.

DISCLOSURE

Technical Problem

Granting of use authority should be able to be set in various manners based on a position of a user, a position of an electronic device, and a situation.

Further, the manager and/or the user should be able to intuitively identify the position and/or use authority of the electronic device.

Aspects of the disclosure are to address at least the above-mentioned problems and/or disadvantages and to provide at least the advantages described below. Accordingly, an aspect of the disclosure is to provide an electronic device for setting authority of an indoor map-based device and an operation method thereof.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication circuit, at least one processor, and a memory storing instructions, wherein when the instructions are executed by the at least one processor, the electronic device may be configured to receive, using the communication circuit, information indicating that a first external electronic device has entered a designated space, from at least one anchor among a plurality of anchors installed in the designated space, in response to the receiving of the information, establish a communication connection with the first external electronic device using the communication circuit, after establishing the communication connection with the first external electronic device, receive a request of use authority of a first device among at least one device positioned in the designated space from the first external electronic device, identify use authority set for the first external electronic device, based on information on the first device and information on the first external electronic device, and transmit information about the set use authority to the first external electronic device and the first device so that the set use authority is applied to the first external electronic device.

In accordance with another aspect of the disclosure, a method for operating an electronic device is provided. The method includes receiving, using a communication circuit of the electronic device, information indicating that a first external electronic device has entered a designated space, from at least one anchor among a plurality of anchors installed in the designated space, in response to the receiving of the information, establishing a communication connection with the first external electronic device using the communication circuit, after establishing the communication connection with the first external electronic device, receiving a request of use authority of a first device among at least one device positioned in the designated space from the first external electronic device, identifying use authority set for the first external electronic device, based on information on the first device and information on the first external electronic device, and transmitting information about the set use authority to the first external electronic device and the first device so that the set use authority is applied to the first external electronic device.

Advantageous Effects

According to various embodiments disclosed in the disclosure, the manager may set the user's use authority in various manners based on the position of the user, the position of the electronic device, and the situation.

The manager and/or user may intuitively identify the position and/or the use authority of the electronic device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the will be more apparent from the following description taken in conjunction with the accompanying drawings, in which disclosure.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
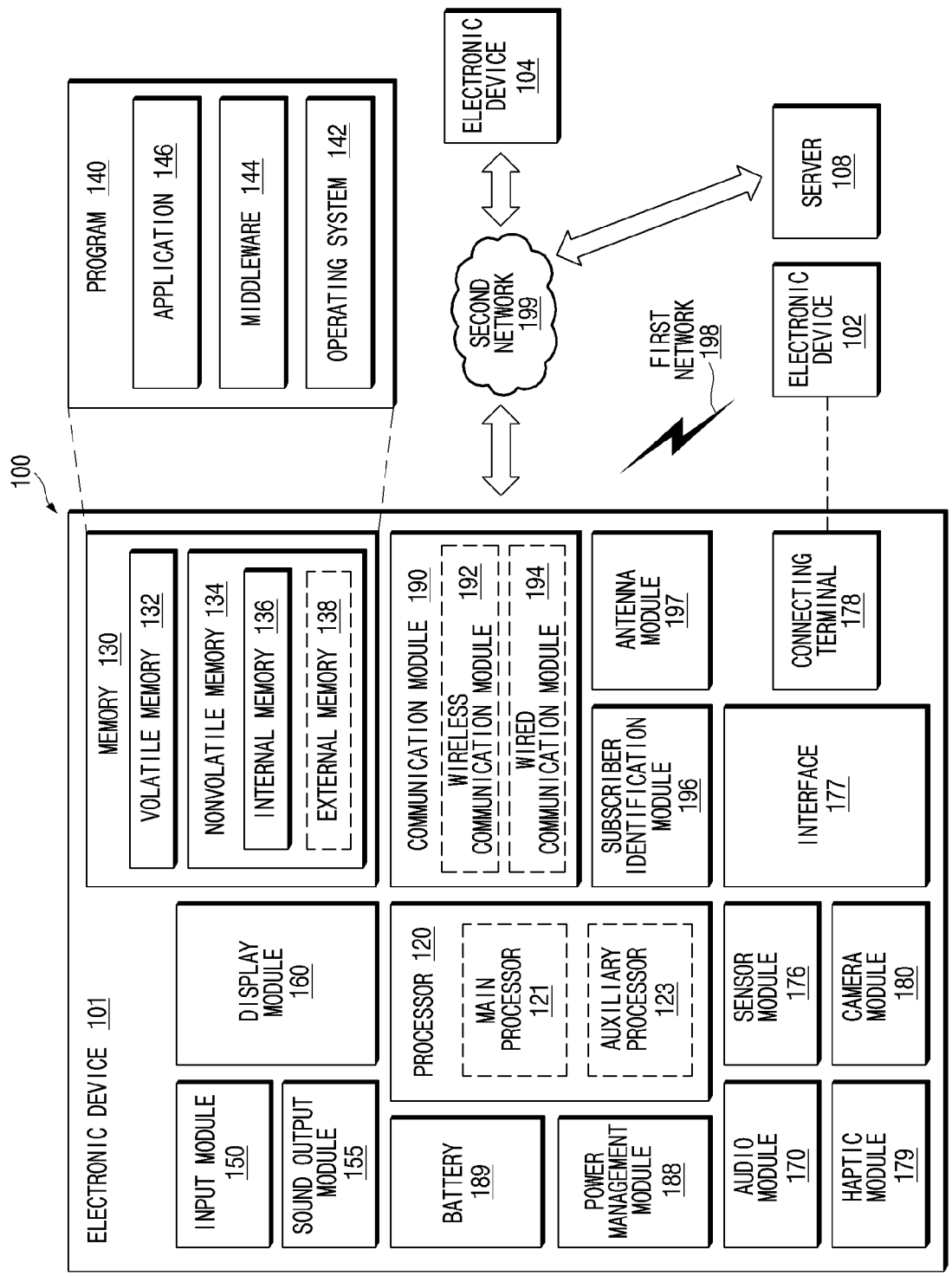
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data about a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, or 104, or the server 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
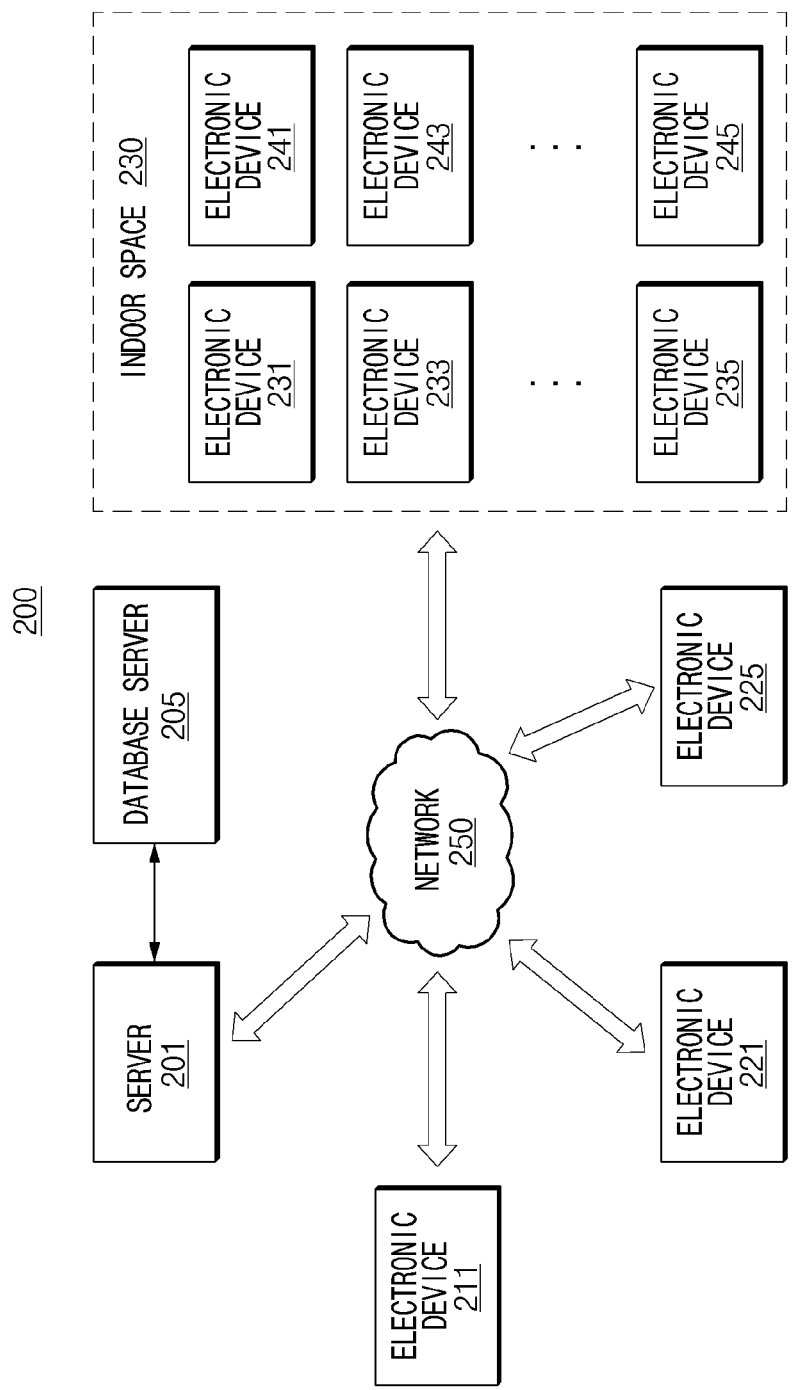
FIG. 2 shows electronic devices in a network environment according to an embodiment of the disclosure.

FIG. 2 shows electronic devices in a network environment according to an embodiment of the disclosure.

Referring to FIG. 2, a network environment 200 may include a server 201, a database server 205, an electronic device 211, an electronic device 221, an electronic device 225, an electronic device 231, an electronic device 233, an electronic device 235, an electronic device 241, an electronic device 243, an electronic device 245, or a combination thereof.

The server 201 may be a server that provides an indoor map-based service.

The database server 205 may be a server that stores therein and manages data about an indoor space 230. The data about the indoor space 230 may include at least one of indoor map data or indoor map information.

The indoor map data may be data related to an indoor map. The indoor map data may be map data representing the indoor space 230. The map data may represent at least one of a two-dimensional (2D) map or a three-dimensional (3D) map. The two-dimensional map may be a plan view. The 3D map may be a map for representing virtual reality (VR), augmented reality (AR), or mixed reality (MR).

The map data may be generated based on at least one image capturing the indoor space 230. The map data may be generated based on objects (e.g., walls, products, and furniture) extracted from at least one image capturing the indoor space 230 at least one point. The map data may be generated based on at least one of a capturing direction of the at least one image or depth information of the extracted objects (e.g., walls, products, and furniture) therefrom. In an embodiment, the map data may be generated by the server 201 based on at least one image captured by the electronic device 211. In another embodiment, the map data may be obtained by the server 201 from another electronic device.

The indoor map information may include partition information between a plurality of spaces of the indoor space 230 (e.g., partition information by a wall). The indoor map information may include information (e.g., identification information, product information) of the electronic devices respectively positioned in the plurality of spaces of the indoor space 230. The indoor map information may include authority setting information related to each of the plurality of spaces of the indoor space 230.

The electronic device 211 may be a manager device for setting authorities of each of a plurality of electronic devices 231, 233, and 235 positioned in the indoor space 230. The electronic device 211 may include at least one of the components of the electronic device 101.

Each of the electronic device 221 and the electronic device 225 may be a user device that requests use authority of each of the plurality of electronic devices 231, 233, and 235. Each of the electronic device 221 and/or the electronic device 225 may include at least one of the components of the electronic device 101.

The electronic device 231, the electronic device 233, and/or the electronic device 235 may be respectively various types of devices positioned in the indoor space 230. Each of the electronic device 231, the electronic device 233, and/or the electronic device 235 may be a portable communication device (e.g., a smartphone), a computer device, a portable multimedia device, a portable medical device, a camera, a wearable device, a home appliance device, or a combination thereof. Each of the electronic device 231, the electronic device 233, and/or the electronic device 235 may include at least one of the components of the electronic device 101. Each of the electronic device 231, the electronic device 233, and/or the electronic device 235 may be referred to as an available device.

Each of the electronic device 241, the electronic device 243, and the electronic device 245 may be an anchor positioned in the indoor space 230. Each of the electronic device 241, the electronic device 243, and/or the electronic device 245 may be classified as a master anchor or a slave anchor. For example, the electronic device 241 may be a master anchor, while each of the electronic device 243, and the electronic device 245 may be a slave anchor.

Each of the electronic device 241, the electronic device 243, and the electronic device 245 may include a communication module supporting a radio access technology (RAT) designated for measuring a position of each of the electronic devices 221, 225, 231, 233, and 235. For example, the radio access technology may be a radio access technology to ultra wide band (UWB), Wi-Fi, Bluetooth, and cellular communication.

Each of the electronic device 241, the electronic device 243, and the electronic device 245 may perform position measurement based on at least one of various position measurement algorithms (e.g., angle of arrival (AoA), time difference of arrival (TDoA), angle of departure (AoD), time of arrival (ToA), time of flight (ToF), or two way ranging (TWR)).

The network 250 may include at least one of the first network 198 (e.g., a short-range wireless communication network or the second network 199 (e.g., a long-distance wireless communication network) of FIG. 1.

Hereinafter, an example in which the server 201 transmits the data about the indoor space 230 to the electronic device 221 will be described.

A user of the electronic device 221 (or the electronic device 225) may enter the indoor space 230 while holding the electronic device 221. Each of the electronic device 241, the electronic device 243, and/or the electronic device 245 positioned in the indoor space 230 may transmit and receive a signal for position measurement to and from the electronic device 221. In an embodiment, each of the electronic device 241, the electronic device 243, and the electronic device 245 may measure a position of the electronic device 221 based on a broadcast signal transmitted from the electronic device 221. In another embodiment, the electronic device 221 may measure the position of the electronic device 221 based on a broadcast signal transmitted from each of the electronic device 241, the electronic device 243, and the electronic device 245.

In an embodiment, the electronic device 221 may establish a wireless connection with the server 201, and transmit the position information of the electronic device 221 to the server 201 based on the wireless connection established with the server 201. In another embodiment, at least one electronic device (e.g., a master anchor) among the electronic device 241, the electronic device 243, or the electronic device 245 may transmit the position information of the electronic device 221 to the server 201. The position information of the electronic device 221 transmitted to the server may include identification information (e.g., a medium access control (MAC) address) of the electronic device 221.

The server 201 may transmit the data about the indoor space 230 to the electronic device 221. The server 201 may transmit the data about the indoor space 230 in which the electronic device 221 is positioned. In an embodiment, the server 201 may transmit the data about the indoor space 230 to the electronic device 221 in response to a request of the data about the indoor space 230 from the electronic device 221. In another embodiment, the server 201 may transmit the data about the indoor space 230 to the electronic device 221 in response to a result of identifying that the electronic device 221 is positioned in the indoor space 230.

The data about the indoor space 230 may be stored in the database server 205. The server 201 may acquire the data about the indoor space 230 from the database server 205 and transmit the acquired data about the indoor space 230 to the electronic device 221. In an embodiment, when the indoor map information is not included in the data about the indoor space 230 obtained from the database server 205, the server 201 may extract the indoor map information from the indoor map data included in the data about the indoor space 230. Thereafter, the server 201 may transmit the extracted indoor map information to the database server 205. The server 201 may transmit the indoor map data and the extracted indoor map information to the electronic device 221.

In an embodiment, the server 201 may identify the partition information (e.g., partition information by a wall) between the plurality of spaces via image processing (e.g., simultaneous localization and map building (SLAM) on the indoor map data. In an embodiment, the server 201 may identify an area of the indoor space 230 in which each of the electronic devices 231, 233, 235, 241, 243, and 245 is present, based on the position information of each of the electronic devices 231, 233, 235, 241, 243, and 245. The server 201 may construct the indoor map information based on the identified information.

Hereinafter, an example in which the server 201 processes an authority check request from the electronic device 221 will be described.

The electronic device 221 may request authority check to the server 201. In an embodiment, the electronic device 221 may request the authority check to the server 201 in response to a result of identifying that the electronic device 221 enters the indoor space 230. In another embodiment, the electronic device 221 may request the server 201 to perform authority check of at least one of the indoor space 230 or the electronic device in the indoor space 230 as indicated by an input of the user of the electronic device 221. The authority check request may include identification information of the electronic device 221.

The server 201 may check the authority of at least one of the indoor space 230 of the electronic device 221 or the electronic device in the indoor space 230 based on authority information stored in the server 201.

The server 201 may transmit a message indicating a result of the authority check to the electronic device 221. The message indicating the authority check result may include an authority check message or an authority absence message. The authority check message may include a use condition about at least one electronic device among the electronic devices 231, 233, and 235.

Hereinafter, an example in which the server 201 processes the authority request from the electronic device 221 will be described.

The electronic device 221 may request authority related to at least one electronic device among the electronic devices 231, 233, and 235 of the indoor space 230 to the server 201. In an embodiment, the electronic device 221 may request authority related to at least one electronic device among the electronic devices 231, 233, and 235 of the indoor space 230 to the server 201 in response to a result of identifying that the electronic device 221 enters the indoor space 230. In another embodiment, the electronic device 221 may request authority related to at least one electronic device indicated by an input from the user of the electronic device 221 among the electronic devices 231, 233, and 235 of the indoor space 230 to the server 201. The authority request may include the identification information of the electronic device 221.

The server 201 may check whether authority related to the electronic device in the indoor space 230 can be granted, based on a previously set authority granting condition. The authority granting condition may be based on information (e.g., a user, position information, or identification information of the electronic device 221) of the electronic device 221 requesting the authority, information (e.g., position information, or identification information) of each of the electronic devices 231, 233, and 235 to which the authority is requested, an authority request time, or a combination thereof. For example, the authority granting condition may be set so that when the electronic device 221 and the electronic device 231 are positioned in a first area of the indoor space 230, the authority is granted to the electronic device 221, whereas when the electronic device 221 and the electronic device 231 are positioned in a second area of the indoor space 230, the authority is not granted to the electronic device 221. In another example, the authority granting condition may be set so that when the authority request occurs within a specified time range (e.g., between 9:00 AM and 12:00 AM), the authority is granted to the electronic device 221, whereas when the authority request occurs within a time range other than the specified time range, the authority is not granted to the electronic device 221.

The server 201 may transmit a message indicating the authority granting result to the electronic device 221. The message indicating the authority granting result may include an authority granting message or an authority granting rejection message. The authority granting message may include information about use conditions (e.g., an available time, an available function, an available space). The available function may include information about an available application among a plurality of applications.

In an embodiment, when the electronic device 221 does not meet an authority approval condition, the server 201 may request authority approval of the electronic device 221 to the electronic device 211. The server 201 may transmit the message indicating the authority granting result to the electronic device 221, based on the authority approval result of the electronic device 211.

Hereinafter, an example in which the server 201 revokes the authority of the electronic device 221 will be described.

After setting the authority to the electronic device 221 or the electronic device 225, the server 201 may identify whether an authority revocation condition of the electronic device 221 is satisfied.

The authority revocation condition may include at least one of a time out of an authority granting time or departure from a permitted space. For example, when a use time of the electronic device 231 allocated to the electronic device 221 expires, the server 201 may revoke the use authority of the electronic device 231 from the electronic device 221. In another example, when the electronic device 221 and/or the electronic device 231 deviate from the permitted space, the server 201 may revoke the use authority of the electronic device 231 from the electronic device 221.

Hereinafter, an example in which server 201 processes a turn-off event will be described.

The server 201 may receive position information of each of the electronic devices positioned in the indoor space 230 from at least one electronic device among the plurality of electronic devices 241, 243, and 245.

The server 201 may identify that the user's electronic device 221 or electronic device 225 is not positioned for a specified time duration in the indoor space 230, based on the position information.

The server 201 may turn off at least one electronic device among the plurality of electronic devices 231, 233, and 235 positioned in the indoor space 230 based on a result of identifying that the designated electronic device of the user is not positioned for the designated time duration.

Hereinafter, an example in which the server 201 processes a new terminal identification event will be described.

The server 201 may receive position information of the electronic devices positioned in the indoor space 230 from at least one electronic device among the plurality of electronic devices 241, 243, and 245.

The server 201 may determine whether the electronic device is a new device based on identification information of the electronic device included in the position information.

When it is determined that the electronic device is the new device, the server 201 may push a message informing the identification of the new device to the electronic device 211. The message pushed to the electronic device 211 may include contents of inquiring whether to register the new device.

In an embodiment, the contents of inquiring whether to register the new device may include contents of at least one of inquiring whether to set the authority granting condition or use condition of the electronic devices 221 and 225. In an embodiment, the contents of inquiring whether to register the new device may include contents of at least one of inquiring whether to set the authority granting condition or use condition of the electronic devices 221 and 225 in relation to the new device as the authority granting condition and/or use condition set for the electronic devices 221 and 225 in relation to another electronic device (e.g., electronic device 231) of the same type as the new device. For example, when the new device is a camera, the server 201 may push the message with reference to at least one of the authority granting condition or use condition in relation to another camera. In another embodiment, the contents of inquiring whether to register the new device may include contents of at least one of inquiring whether to set the authority granting condition or use condition of the electronic devices 221 and 225 in relation to the new device as at least one of the authority granting condition or use condition set for the electronic devices 221 and 225 in relation to another electronic device (e.g., electronic device 235) of a type (e.g., a similar type) related to the new device. In this regard, electronic devices used sequentially (e.g., a washing machine and a dryer), and electronic devices used simultaneously (e.g., a television and a speaker) may be electronic devices of related types. For example, when the new device is the washing machine, the server 201 may push the message with reference to at least one of the authority granting condition or use condition related to the dryer.

In an embodiment, the server 201 may set the authority granting condition and/or use condition related to the new device based on a response from the electronic device 211 to the pushed message.

Figure 3:
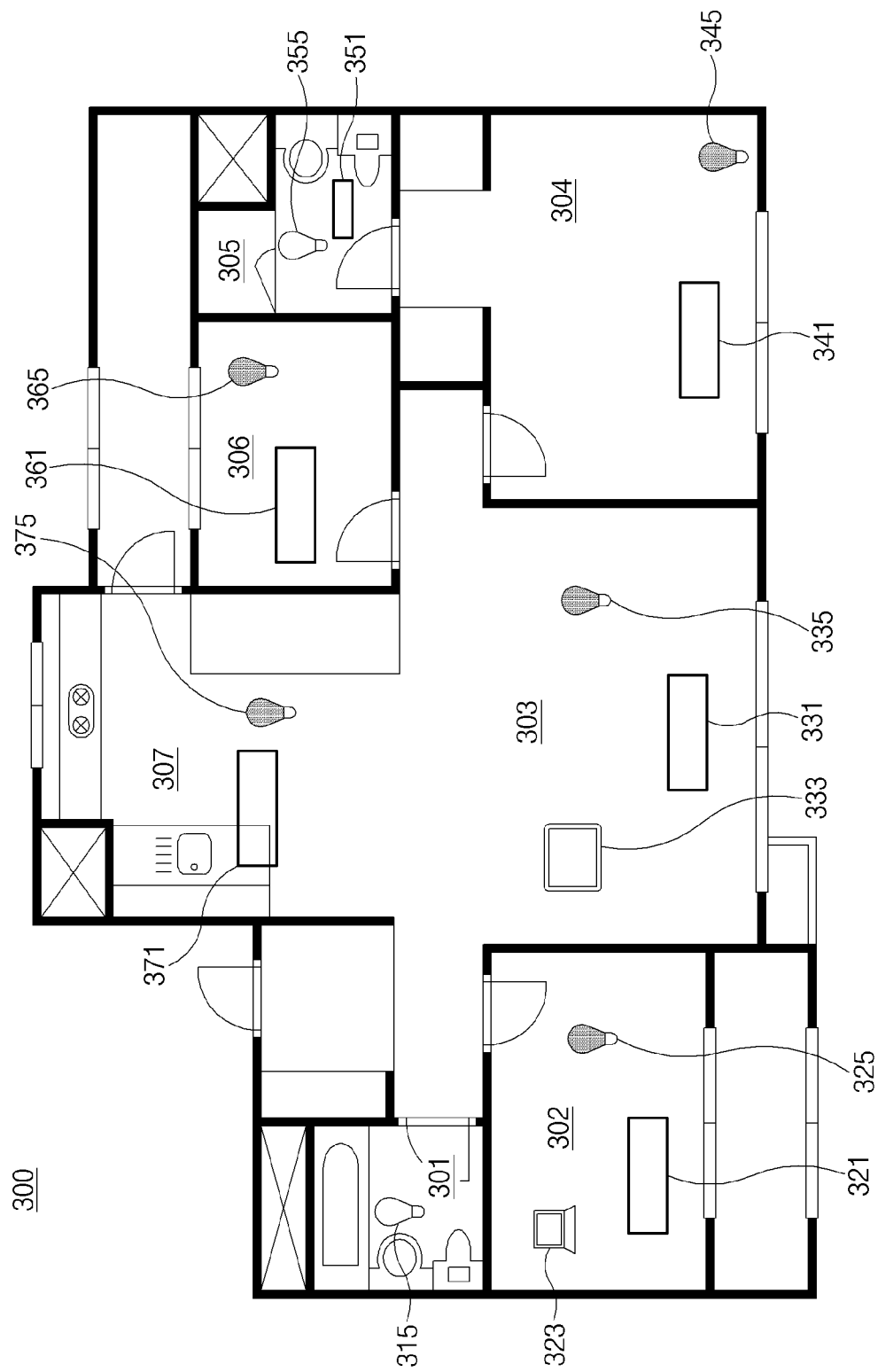
FIG. 3 shows an indoor map according to an embodiment of the disclosure.

FIG. 3 shows an indoor map according to an embodiment of the disclosure.

An indoor map 300 in FIG. 3 may represent the indoor space 230 in FIG. 2. In an embodiment, the indoor map 300 may be being displayed on a display of each of the electronic device 211, the electronic device 221, and/or the electronic device 221. Hereinafter, it is assumed that the indoor map 300 is being displayed on the electronic device 211.

Referring to FIG. 3, the indoor map 300 may be divided into a plurality of spaces 301, 302, 303, 304, 305, 306, and 307.

A smart light bulb 315 may be positioned in the first space 301, and the smart light bulb 315 may be in a turned off state. The electronic device 211 may display an image object indicating that the smart light bulb 315 in the first space 301 is in the turned-off state.

A laptop 323 and a smart light bulb 325 may be positioned in the second space 302, and the smart light bulb 325 may be in a turned-on state. The electronic device 211 may display an image object indicating that the smart light bulb 325 in the second space 302 is in the turned-on state. The electronic device 211 may display an image object indicating that the laptop 323 is positioned in the second space 302. The electronic device 211 may display a device list 321 indicating devices allowed to be available in the second space 302.

A tablet personal computer (PC) 333 and a smart light bulb 335 may be positioned in the third space 303, and the smart light bulb 335 may be in turned-on state. The electronic device 211 may display an image object indicating that the smart light bulb 335 in the third space 303 is in a turned-on state. The electronic device 211 may display an image object indicating that the tablet PC 333 is positioned in the third space 303. The electronic device 211 may display a device list 331 indicating devices allowed to be available in the third space 303.

Similarly, the electronic device 211 may display image objects respectively indicating states of a smart light bulb 345, a smart light bulb 355, a smart light bulb 365, and a smart light bulb 375 respectively positioned in the fourth space 304, the fifth space 305, the sixth space 306, and the seventh space 307. Further, the electronic device 211 may display a device list 341 of devices allowed to be available in the fourth space 304, a device list 351 of devices allowed to be available in the fifth space 305, a device list 361 of devices allowed to be available in the sixth space 306, or a device list 371 of devices allowed to be available in the seventh space 307.

In an embodiment, the electronic device 211 may identify one of the plurality of spaces 301, 302, 303, 304, 305, 306, and 307 based on the user's input (e.g., touch). The electronic device 211 may display the identified space in an enlarged manner. The electronic device 211 may display a device list of electronic devices allowed to be available in the identified space.

Figure 4:
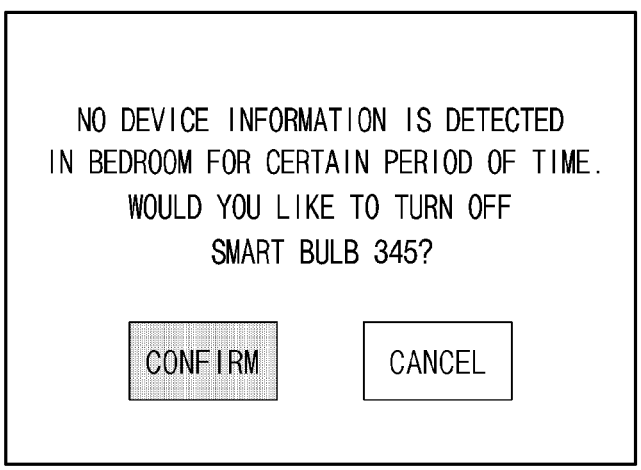
FIG. 4 shows a user interface displayed on an electronic device according to an embodiment of the disclosure.

FIG. 4 shows a user interface displayed on the electronic device 211 according to an embodiment of the disclosure.

FIG. 4 shows a user interface 400 displaying the message pushed by the server 201 to the electronic device 211.

In an embodiment, the server 201 may push a message to the electronic device 211 when a specified message push condition is satisfied. The server 201 may push a message to the electronic device 211 when a predetermined time duration had elapsed after the specified message push condition is satisfied. For example, the message push condition may include the electronic device 221 or 225 entering a specific space, the electronic device 221 or 225 departing from a specific space, the electronic device 231, 233, or 235 entering a specific space, the electronic device 231, 233, or 235 departing from a specific space, or a combination thereof.

Referring to FIG. 4, the user interface 400 may include a message pushed from the server 201 to the electronic device 211 as the predetermined time duration has elapsed while the electronic device 221 or 225 is positioned out of the fourth space 304.

The pushed message may include a control request from the electronic device 231, 233, or 235. For example, the pushed message may include a control request of requesting to turn-off the smart light bulb 345.

Figure 5A:
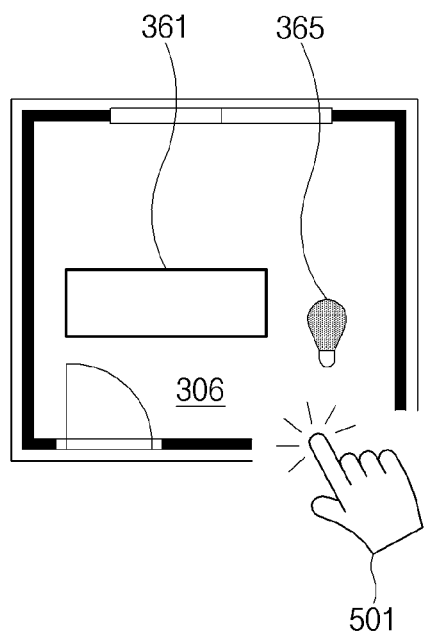
FIG. 5A shows a user interface displayed on an electronic device according to an embodiment of the disclosure.
Figure 5A:
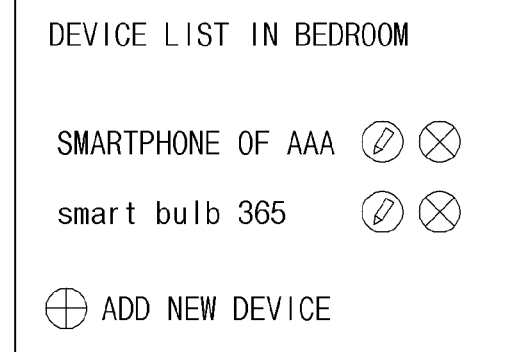

FIG. 5A shows a user interface 500 displayed on an electronic device according to an embodiment of the disclosure.

FIG. 5A shows an example 510 in which the electronic device 211 selects the sixth space 306 and a user interface 520 in which the device list 361 of the sixth space 306 is displayed in detail.

In an embodiment, while the indoor map 300 is displayed, the electronic device 211 may receive a user input 501. The user input 501 may be an input for selecting the sixth space 306.

The electronic device 211 may display the device list 361 of the sixth space 306 in detail based on the user input 501.

Referring to FIG. 5A, the user interface 520 may include identification information of a smartphone (e.g., the electronic device 221, the electronic device 231 and/or the smart light bulb 365). The user interface 520 may include an icon for modifying the authority of the smartphone and/or the smart light bulb 365. The user interface 520 may include an icon to exclude the smartphone and/or the smart light bulb 365. The user interface 520 may include an icon for adding a new device.

Figure 5B:
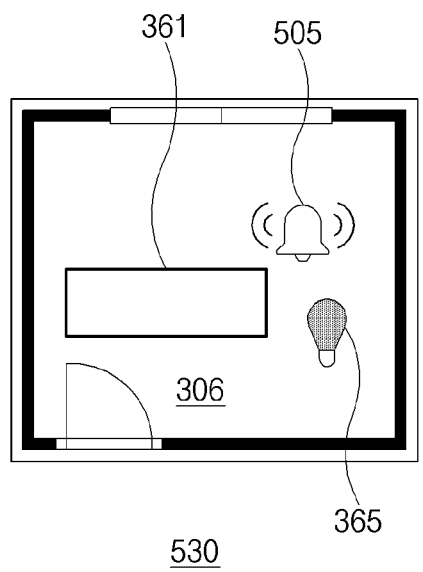
FIG. 5B shows a user interface displayed on an electronic device according to an embodiment of the disclosure.

FIG. 5B shows a user interface 505 displayed on the electronic device 211 according to an embodiment of the disclosure.

Referring to FIG. 5B, it shows the user interface 530 displaying a notification that the new device is detected, as notified from the server 201 to the electronic device 211, and a user interface 540 requesting authority setting of the new device.

In an embodiment, when the new device is detected, the server 201 may notify the electronic device 211 that the new device is detected. The server 201 may receive a signal indicating the position information of the electronic device from at least one of electronic devices 241, 243, and 245, and may notify the electronic device 211 that the new device is detected, based on the received signal. For example, when identification information of the electronic device included in the signal indicating the position information of the electronic device is new, the server 201 may identify that the new device is detected.

The electronic device 211 may display an image object in the sixth space 306 where the new device is detected while displaying the indoor map 300.

The electronic device 211 may display the user interface 540 requesting the authority setting of the new device based on a user input for selecting the image object.

Figure 6:
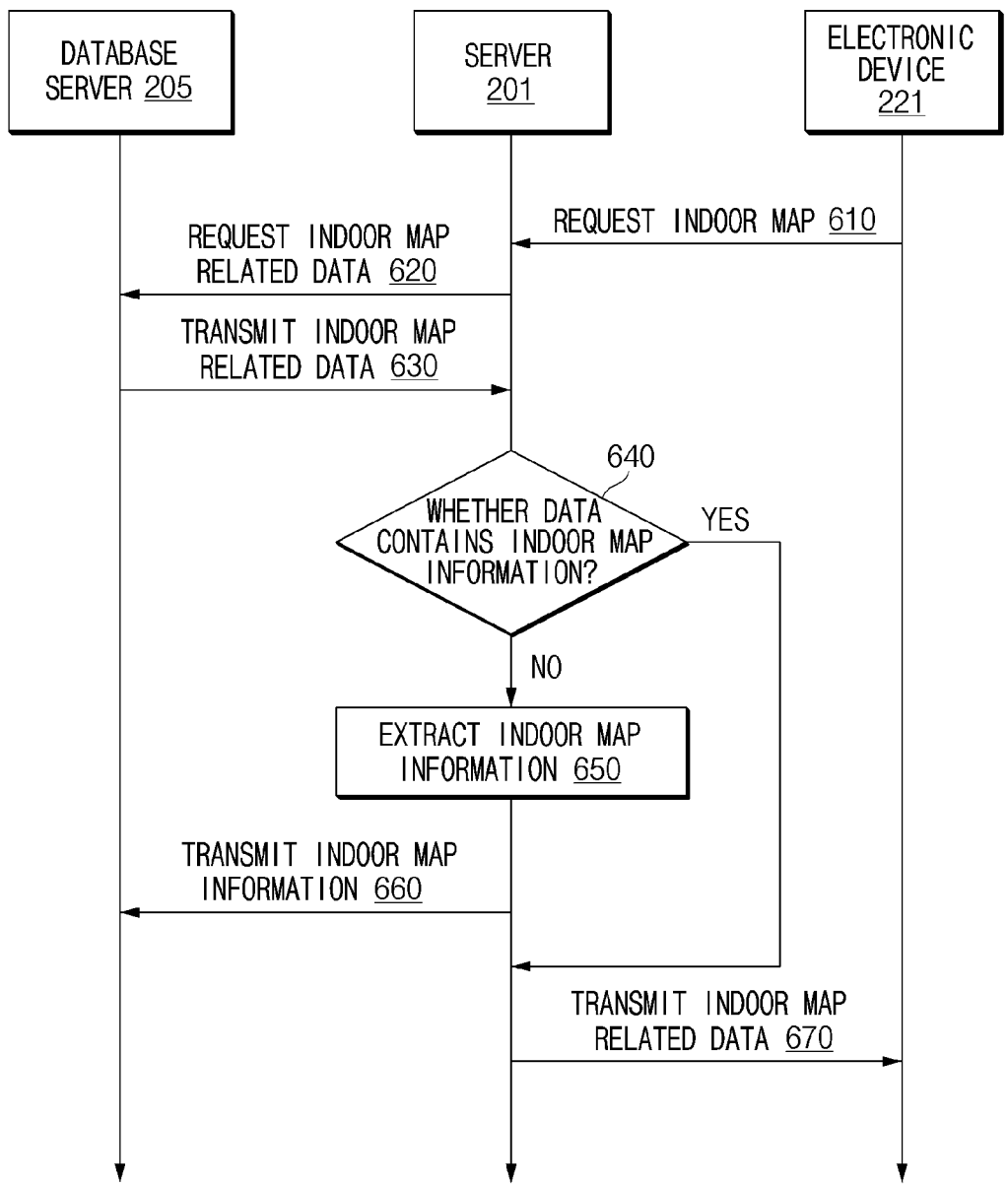
FIG. 6 is a flowchart showing an operation method of a server according to an embodiment of the disclosure.

FIG. 6 is a flowchart showing an operation method of a server according to an embodiment of the disclosure.

Referring to FIG. 6, in operation 610, the electronic device 221 may request an indoor map to the server 201. The electronic device 221 may establish a wireless connection with the server 201 and request the data about the indoor space 230 to the server 201 based on the established wireless connection with the server 201.

In operation 620, the server 201 may request the data about the indoor map to the database server 205.

In operation 630, the database server 205 may transmit data about the indoor map to the server 201.

In operation 640, the server 201 may determine whether the indoor map information is included in the data about the indoor map.

When the indoor map information is included in the data about the indoor map, the server 201 may perform operation 670. When the indoor map information is not included in the data about the indoor map, the server 201 may perform operation 650.

In operation 650, the server 201 may extract the indoor map information.

The server 201 may identify the partition information between the plurality of spaces (e.g., partition information by a wall) via image processing (e.g., SLAM) on the indoor map data. In an embodiment, the server 201 may identify an area of the indoor space 230 in which each of the electronic devices 231, 233, 235, 241, 243, and 245 is present, based on the position information of each of the electronic devices 231, 233, 235, 241, 243, and 245. The server 201 may build the indoor map information based on the identified information.

In operation 660, the server 201 may transmit the indoor map information to the database server 205.

In operation 670, the server 201 may transmit the data about the indoor map to the electronic device 221. The server 201 may transmit the indoor map data, and the indoor map related data including the indoor map information to the electronic device 221.

FIG. 6 shows an example in which the electronic device 221 requests the indoor map to the server 201. However, this is only an example. The electronic device 211 may request the indoor map to the server 201, based on the operations in FIG. 6.

Figure 7:
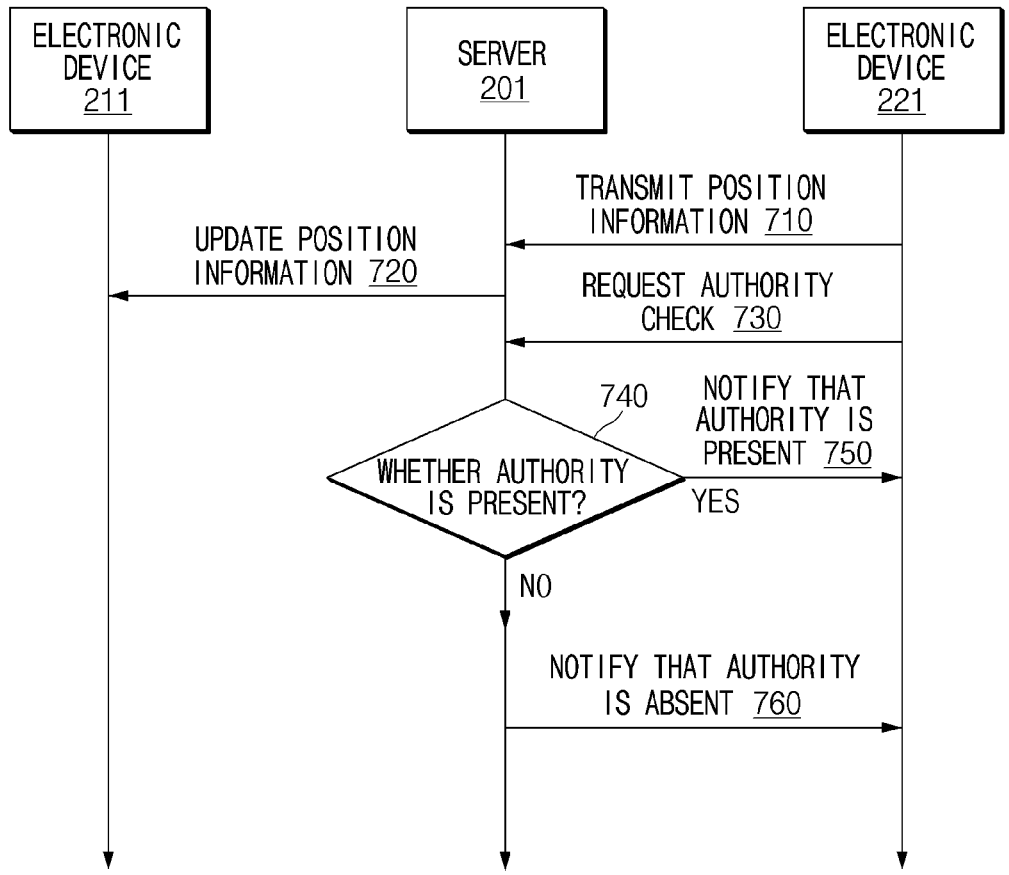
FIG. 7 is a flowchart showing an operation method of a server according to an embodiment of the disclosure.

FIG. 7 is a flowchart showing an operation method of a server according to an embodiment of the disclosure.

Referring to FIG. 7, in operation 710, the electronic device 221 may transmit position information to the server 201. The position information may include identification information of the electronic device 221.

In operation 720, the server 201 may transmit position information to the electronic device 211. The position information may include identification information of the electronic device 221.

In operation 730, the electronic device 221 may request authority check to the server 201. The authority check request may include at least one of information on the indoor space 230 on which the authority check is requested, or identification information on a specific electronic device in the indoor space 230 on which the authority check is requested.

In operation 740, the server 201 may determine whether the authority of the electronic device 221 exists. The server 201 may check the authority related to at least one of the indoor space 230 of the electronic device 221 or the electronic device in the indoor space 230, based on the authority information stored in the server 201.

When the authority of the electronic device 221 exists, the server 201 may perform operation 750. When the authority of the electronic device 221 does not exist, the server 201 may perform operation 760.

In operation 750, the server 201 may send the authority check message to the electronic device 221. The authority check message may include a use condition related to at least one electronic device among the electronic devices 231, 233, and 235.

In operation 760, the server 201 may transmit an authority absence message to the electronic device 221.

Figure 8:
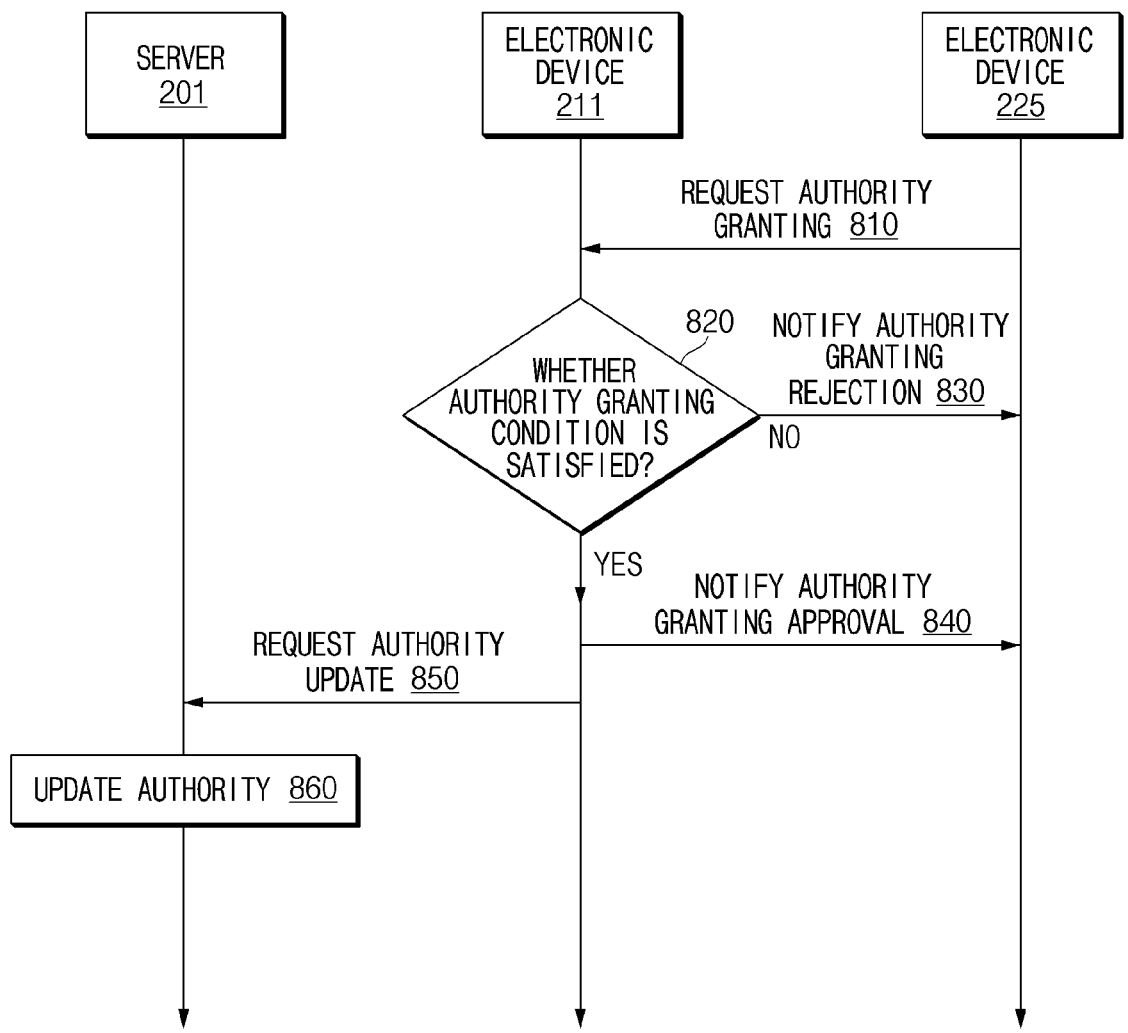
FIG. 8 is a flowchart showing an operation method of a server according to an embodiment of the disclosure.

FIG. 8 is a flowchart showing an operation method of a server according to an embodiment of the disclosure.

Referring to FIG. 8, in operation 810, the electronic device 225 may request authority granting to the electronic device 211.

In operation 820, the electronic device 211 may determine whether the electronic device 225 satisfies the authority granting condition. The authority granting condition may be based on information (e.g., a user, position information, or identification information of the electronic device 221) of the electronic device 221 requesting the authority, information (e.g., position information, or identification information) of each of the electronic devices 231, 233, and 235 to which the authority is requested, an authority request time, or a combination thereof. For example, the authority granting condition may be set so that when the electronic device 221 and the electronic device 231 are positioned in a first area of the indoor space 230, the authority is granted to the electronic device 221, whereas when the electronic device 221 and the electronic device 231 are positioned in a second area of the indoor space 230, the authority is not granted to the electronic device 221. In another example, the authority granting condition may be set so that when the authority request occurs within a specified time range (e.g., between 9:00 AM and 12:00 AM), the authority is granted to the electronic device 221, whereas when the authority request occurs within a time range other than the specified time range, the authority is not granted to the electronic device 221.

When the electronic device 225 satisfies the authority granting condition, the electronic device 211 may perform operation 840. When the electronic device 225 does not satisfy the authority granting condition, the electronic device 211 may perform operation 830.

In operation 830, the electronic device 211 may transmit a request rejection message to the electronic device 225. The request rejection message may include information on a reason why the authority granting condition is not satisfied. For example, the request rejection message may include contents indicating that the authority granting is rejected because the electronic device 221 is not positioned at a specified position.

In operation 840, the electronic device 211 may transmit an authority granting message to the electronic device 225. The authority granting message may include information on use condition (e.g., available time, available function, and available space). The available function may include information on an available application among a plurality of applications.

In operation 850, the electronic device 211 may request authority update to the server 201.

In operation 860, the server 201 may update the authority of the electronic device 225.

Figure 9:
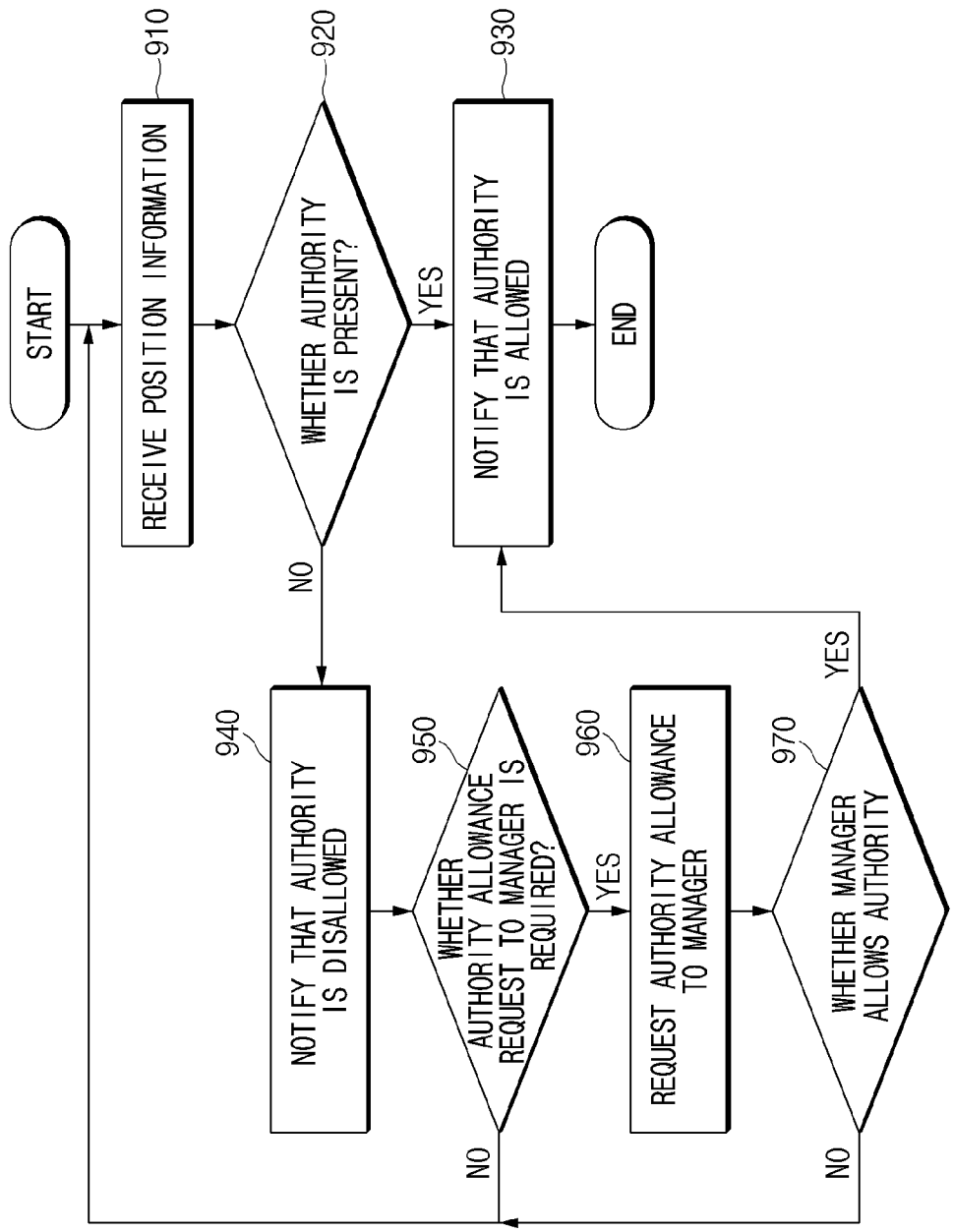
FIG. 9 is a flowchart showing an operation method of a server according to an embodiment of the disclosure.

FIG. 9 is a flowchart showing an operation method of a server according to an embodiment of the disclosure.

Referring to FIG. 9, in operation 910, the server 201 may receive position information.

In operation 920, the server 201 may determine whether authority of an external electronic device (e.g., the electronic device 221 or the electronic device 225) exists.

When the authority of the external electronic device exists, the server 201 may perform operation 930. When the authority of the external electronic device does not exist, the server 201 may perform operation 940.

In operation 930, the server 201 may transmit an authority granting message to the external electronic device.

In operation 940, the server 201 may transmit an authority granting rejection message to the external electronic device.

In operation 950, the server 201 may determine whether an authority allowance request to the manager (e.g., the electronic device 211) is required. For example, when the authority granting condition for the external electronic device is not set, the server 201 may determine that the authority allowance request to the manager is required. In another example, when the authority granting condition for the external electronic device is set, the server 201 may determine that the authority allowance request to the manager is not required.

When the authority allowance request to the manager is required, the server 201 may perform operation 960. When the authority allowance request to the manager is not required, the server 201 may perform operation 910.

In operation 960, the server 201 may request the authority allowance to the manager.

In operation 970, the server 201 may determine whether the manager allows authority of the external electronic device.

When the manager allows the authority of the external electronic device, the server 201 may perform operation 930. When the manager does not allow the authority of the external electronic device, the server 201 may perform operation 910.

Figure 10:
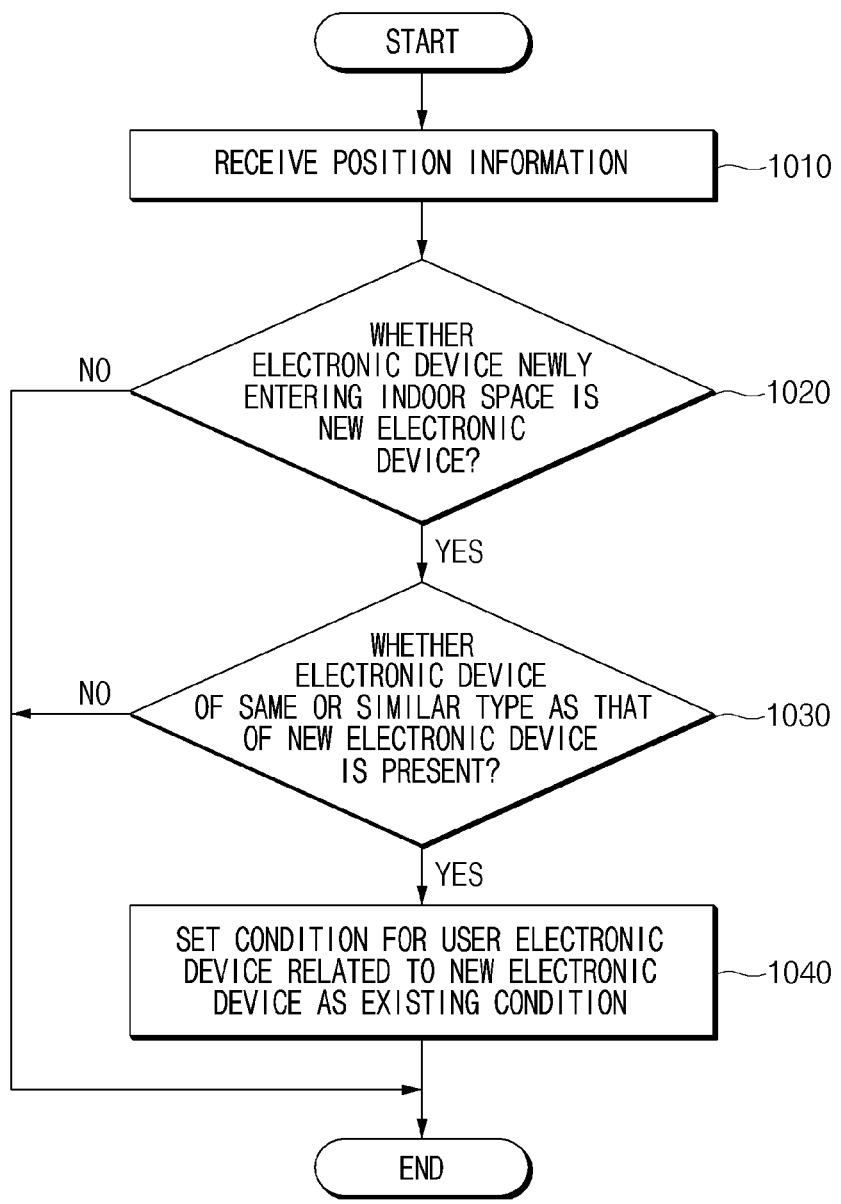
FIG. 10 is a flowchart showing an operation method of a server according to an embodiment of the disclosure.

FIG. 10 is a flowchart showing an operation method of the server 201 according to an embodiment of the disclosure.

Referring to FIG. 10, in operation 1010, the server 201 may receive position information. In an embodiment, the server 201 may receive the position information of an electronic device newly entering the indoor space 230.

In operation 1020, the server 201 may determine whether the electronic device newly entering the indoor space 230 is a new electronic device. In an embodiment, the server 201 may determine that the electronic device newly entering the indoor space 230 is a new electronic device when identification information of the electronic device newly entering the indoor space 230 is not stored in the server 201 or the database server 205.

In operation 1020, when the electronic device newly entering the indoor space 230 is a new electronic device, the server 201 may perform operation 1030. In operation 1020, when the electronic device newly entering the indoor space 230 is not a new electronic device, the server 201 may terminate the operation according to FIG. 10.

In operation 1030, the server 201 may determine whether an electronic device of the same or similar type as that of the new electronic device exists. The server 201 may identify an electronic device of the same or similar type as that of the new electronic device among the plurality of electronic devices 231, 233, and 235 existing in the indoor space 230, based on product information of the new electronic device. In this regard, electronic devices having the same product information may be identified as the same type of electronic devices. Electronic devices having similar product information may be identified as similar types of electronic devices. Electronic devices used sequentially (e.g., a washing machine and a dryer) may be similar types of electronic devices, and electronic devices used simultaneously (e.g., a television and a speaker) may be similar types of electronic devices.

When, in operation 1030, an electronic device of the same or similar type as that of the new electronic device is present, the server 201 may perform operation 1040. When, in operation 1030, there is no electronic device of the same or similar type as that of the new electronic device, the server 201 may terminate the operation according to FIG. 10.

In operation 1040, the server 201 may set a condition for the user electronic device related to the new electronic device as an existing condition. In an embodiment, the server 201 may set at least on of an authority granting condition or a use condition for the electronic devices 221 and 225 related to the new electronic device as at least one of an authority granting condition or use conditions set for the electronic devices 221 and 225 in relation to another electronic device (e.g., the electronic device 231) of the same or similar type as that of the new electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic,"

"logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit;
memory storing instructions; and
at least one processor communicatively coupled to the communication circuit and the memory,
wherein the instructions, when executed by the at least one processor individually or collectively, cause the electronic device to:
receive, using the communication circuit, information associated with entering of a first external electronic device in a designated space, from at least one anchor among a plurality of anchors positioned in the designated space,
in response to the receiving of the information, establish, using the communication circuit, a communication connection with the first external electronic device positioned in the designated space,
after establishing the communication connection with the first external electronic device, provide, to the first external electronic device, information associated with the designated space and information associated with at least one device positioned in the designated space,
receive, from the first external electronic device, a request of use authority for a first device among the at least one device,
identify the use authority set for the first device,
determine whether a granting condition for the identified use authority is satisfied based on first information associated with the first external electronic device and second information associated with the first device, and
in response to determining that the granting condition for the identified use authority is satisfied, transmit information about the identified use authority for the first device to at least one of the first external electronic device and the first device so that the identified use authority is granted to the first external electronic device.

2. The electronic device of claim 1, wherein, the instructions, when executed by the at least one processor individually or collectively, further cause the electronic device to:
in response to the receiving of the request, request the use authority for the first device to a second external electronic device capable of setting use authority of the at least one device positioned in the designated space, and
receive information about the use authority corresponding to the request from the second external electronic device.

3. The electronic device of claim 1, wherein; the instructions, when executed by the at least one processor individually or collectively, further cause the electronic device to:
after the identified use authority has been granted to the first external electronic device, transmit position information of the first external electronic device to the second external electronic device.

4. The electronic device of claim 1, wherein
the information associated with the designated space includes map information about the designated space.

5. The electronic device of claim 1, wherein;
the first information associated with the first external electronic device includes information for a first area of the designated space in which the first external electronic device is positioned, and
wherein the second information associated with the first device includes information for a second area of the designated space in which the first device is positioned.

6. The electronic device of claim 1, wherein the
information associated with the designated space includes information about the plurality of anchors positioned in the designated space.

7. The electronic device of claim 1, wherein the instructions, when executed by the at least one processor individually or collectively, further cause the electronic device to:
receive further information indicating that at least one of the first external electronic device or the first device has departed from the designated space, from the at least one anchor among the plurality of anchors, using the communication circuit, and
revoke the use authority granted to the first external electronic device in response to the receiving of the further information.

8. The electronic device of claim 1, wherein the instructions, when executed by the at least one processor individually or collectively, further cause the electronic device to:
after the use authority has been granted to the first external electronic device, identify whether a revoking condition of the use authority is satisfied, and
revoke the use authority granted to the first external electronic device based on a result of identifying that the revoking condition of the use authority is satisfied.

9. The electronic device of claim 8, wherein the revoking condition comprises at least one of a time out of a use time or a departure from an allowed space.

10. The electronic device of claim 1, wherein the instructions, when executed by the at least one processor individually or collectively, further cause the electronic device to:
receive position information of electronic devices positioned in the designated space from the at least one anchor among the plurality of anchors, using the communication circuit,
identify that a designated third external electronic device of a user is not positioned in the designated space for a designated time, based on the position information, and
turn-off a second device of a designated type of the at least one device, based on a result of identifying that the designated third external electronic device is not positioned in the designated space for the designated time.

11. A method for operating an electronic device, the method comprising:
receiving, using a communication circuit of the electronic device, information associated with entering of a first external electronic device in a designated space, from at least one anchor among a plurality of anchors positioned in the designated space;
in response to the receiving of the information, establishing, using the communication circuit, a communication connection with the first external electronic device positioned in the designated space;
after establishing the communication connection with the first external electronic device, providing, to the first external electronic device, information associated with the designated space and information associated with at least one device positioned in the designated space;
receiving, from the first external electronic device, a request of use authority of a first device among the at least one device;
identifying the use authority for the first device;
determining whether a granting condition for the identified use authority is satisfied, based on first information associated with the first external electronic device and second information associated with the first device; and
in response to determining that the granting condition for the identified use authority is satisfied, transmitting information about the identified use authority for the first device to the first external electronic device and the first device so that the identified use authority is granted to the first external electronic device.

12. The method of claim 11, wherein the identifying of the use authority comprises:
in response to the receiving of the request, requesting the use authority for the first device to a second external electronic device capable of setting use authority of the at least one device positioned in the designated space; and
receiving information about the use authority corresponding to the request from the second external electronic device.

13. The method of claim 11, wherein the method further comprises:
after the identified use authority has been granted to the first external electronic device, transmitting position information of the first external electronic device to a second external electronic device.

14. The method of claim 11, wherein the
information associated with the designated space includes map information about the designated space.

15. The method of claim 11, wherein the
first information associated with the first external electronic device includes information for a first area of the designated space in which the first external electronic device is positioned, and
wherein the second information associated with the first device includes information for a second area of the designated space in which the first device is positioned.

16. The method of claim 11, wherein the
information associated with the designated space includes information about the plurality of anchors positioned in the designated space.

17. The method of claim 11, wherein the method further comprises:
receiving further information indicating that at least one of the first external electronic device or the first device has departed from the designated space, from the at least one anchor among the plurality of anchors, using the communication circuit; and
revoking the use authority granted to the first external electronic device in response to the receiving of the further information.

18. The method of claim 11, wherein the method further comprises:
after the use authority has been granted to the first external electronic device, identifying whether a revoking condition of the use authority is satisfied; and
revoking the use authority granted to the first external electronic device based on a result of identifying that the revoking condition of the use authority is satisfied.

19. The method of claim 18, wherein the revoking condition includes at least one of a time out of a use time or a departure from an allowed space.

20. The method of claim 11, wherein the method further comprises:

receiving position information of electronic devices positioned in the designated space from the at least one anchor among the plurality of anchors, using the communication circuit;

identifying that a designated third external electronic device of a user is not positioned in the designated space for a designated time, based on the position information; and turning-off a second device of a designated type of the at least one device, based on a result of identifying that the third external electronic device is not positioned in the designated space for the designated time.

* * * * *